United States Patent
Both

(10) Patent No.: US 7,354,474 B2
(45) Date of Patent: Apr. 8, 2008

(54) DRY DUST FILTER FOR USING IN OPERATIONS ENDANGERED BY GASES

(75) Inventor: Reinhold Both, Gelsenkirchen (DE)

(73) Assignee: CFT GmbH Compact Filter Technic, Gladbeck (DE)

( * ) Notice: Subject to any disclaimer, the term of this patent is extended or adjusted under 35 U.S.C. 154(b) by 307 days.

(21) Appl. No.: 10/543,785

(22) PCT Filed: Dec. 24, 2003

(86) PCT No.: PCT/DK03/04271

§ 371 (c)(1),
(2), (4) Date: Jul. 28, 2005

(87) PCT Pub. No.: WO2004/067149

PCT Pub. Date: Aug. 12, 2004

(65) Prior Publication Data

US 2006/0260470 A1 Nov. 23, 2006

(51) Int. Cl.
*B03C 3/60* (2006.01)
(52) U.S. Cl. .............. 96/69; 55/360; 55/502; 96/53; 96/62; 96/83; 96/88
(58) Field of Classification Search ........... 96/88, 96/66–69, 83, 60, 62, 52, 53; 95/78; 55/360, 55/497, 502
See application file for complete search history.

(56) References Cited

U.S. PATENT DOCUMENTS

| | | | | |
|---|---|---|---|---|
| 3,121,825 A * | 2/1964 | Abegg et al. | ............... | 361/215 |
| 3,242,649 A * | 3/1966 | Rivers | ............... | 96/67 |
| 4,322,232 A * | 3/1982 | Beane | ............... | 55/360 |
| 4,541,849 A * | 9/1985 | Schade et al. | ............... | 96/88 |
| 5,259,190 A | 11/1993 | Bagley et al. | ............... | 60/300 |
| 5,310,416 A * | 5/1994 | Borger et al. | ............... | 95/64 |
| 5,527,569 A * | 6/1996 | Hobson et al. | ............ | 428/35.2 |
| 5,630,866 A * | 5/1997 | Gregg | ............... | 96/67 |
| 5,766,318 A * | 6/1998 | Loreth et al. | ............... | 96/69 |
| 5,868,807 A | 2/1999 | Luy et al. | ............... | 55/302 |
| 5,993,521 A * | 11/1999 | Loreth et al. | ............... | 96/69 |
| 6,090,189 A * | 7/2000 | Wikstrom et al. | ............ | 96/69 |
| 6,099,726 A * | 8/2000 | Gembolis et al. | ............ | 210/243 |
| 6,117,216 A * | 9/2000 | Loreth | ............... | 96/62 |
| 6,241,810 B1 * | 6/2001 | Wikstrom et al. | ............ | 96/69 |
| 6,387,142 B1 * | 5/2002 | Pieciak et al. | ............... | 55/493 |
| 2002/0185003 A1 * | 12/2002 | Potter | ............... | 95/57 |

FOREIGN PATENT DOCUMENTS

WO   WO 87/01301 A1 * 3/1987   ............ 55/360
WO   WO 93/13303        7/1993

\* cited by examiner

*Primary Examiner*—Richard L. Chiesa
(74) *Attorney, Agent, or Firm*—James Creighton Wray; Clifford D. Hyra

(57) ABSTRACT

The invention related to dust filters (1) which are especially used in operations endangered by gases and comprise filter elements (10) rendered antistatic by means of derivative constituents such as carbon fibres, salts or special steel fibres (26, 27). The filter material (10) is connected to the housing frame (14) by use of conductors (16), bypassing the seal (15), in such a way that a negative electrical charge of the inner chamber of the individual filter element (10) or the dust filter (1) is avoided.

18 Claims, 4 Drawing Sheets

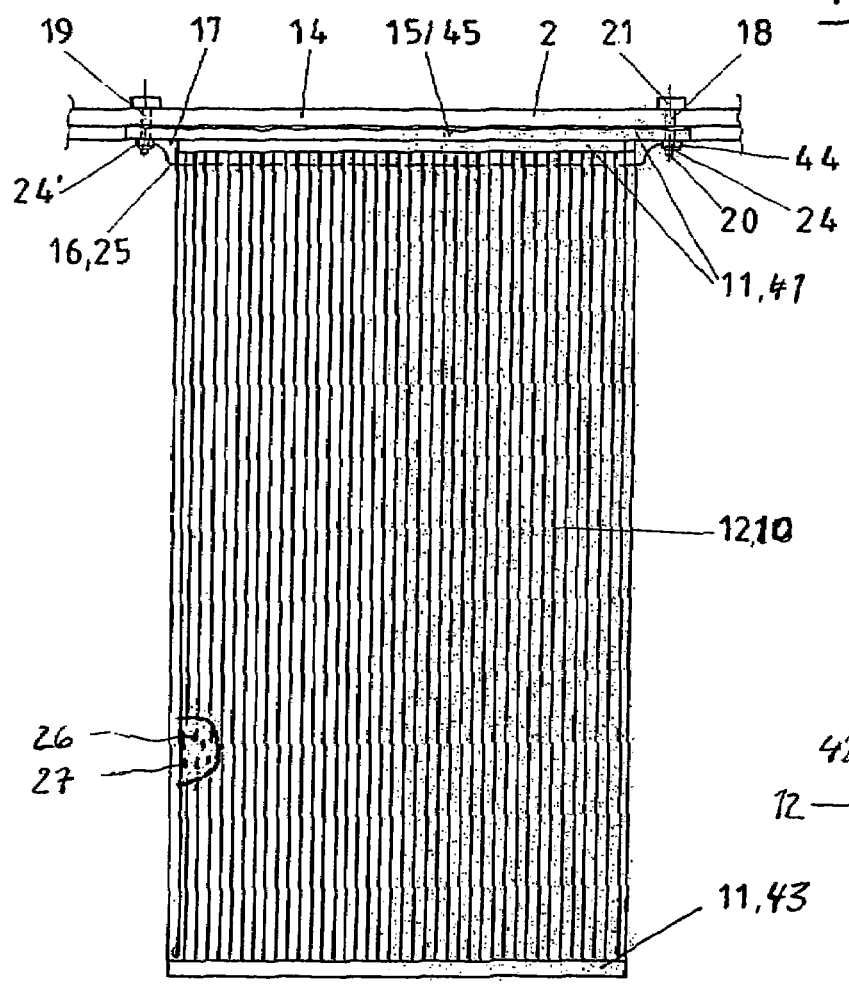
Fig.3
Fig 3a
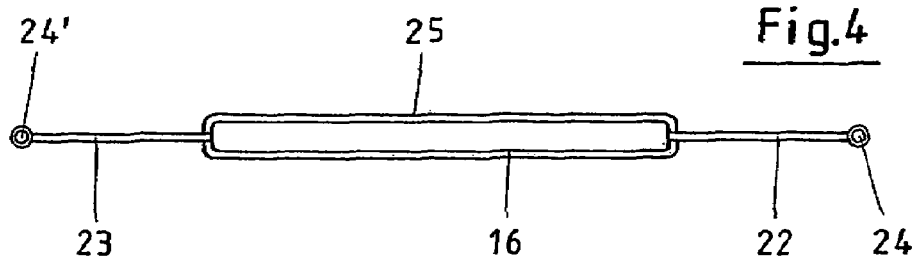
Fig.4

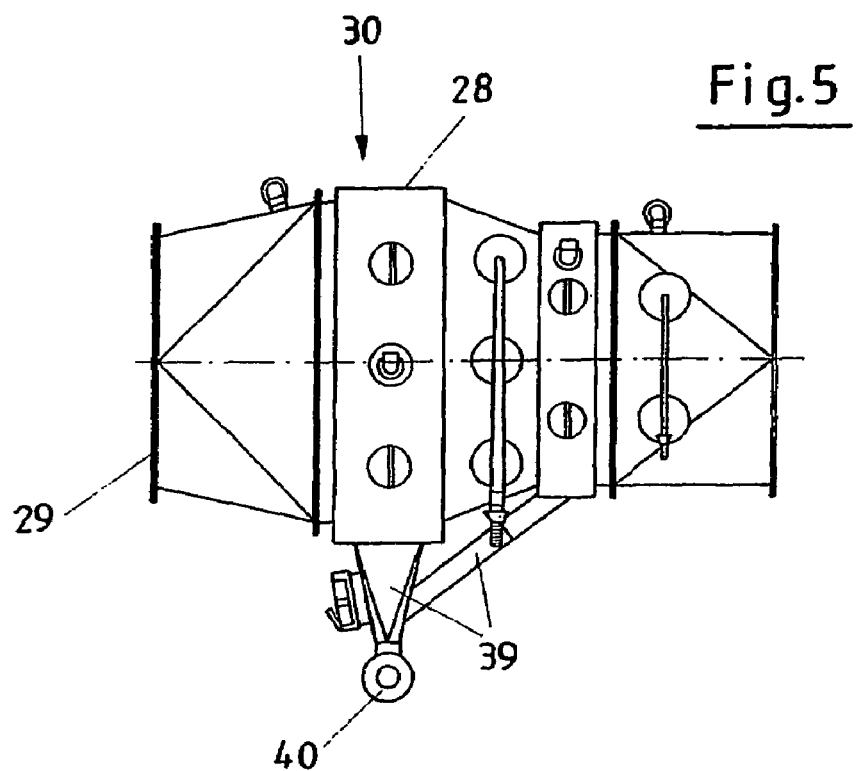
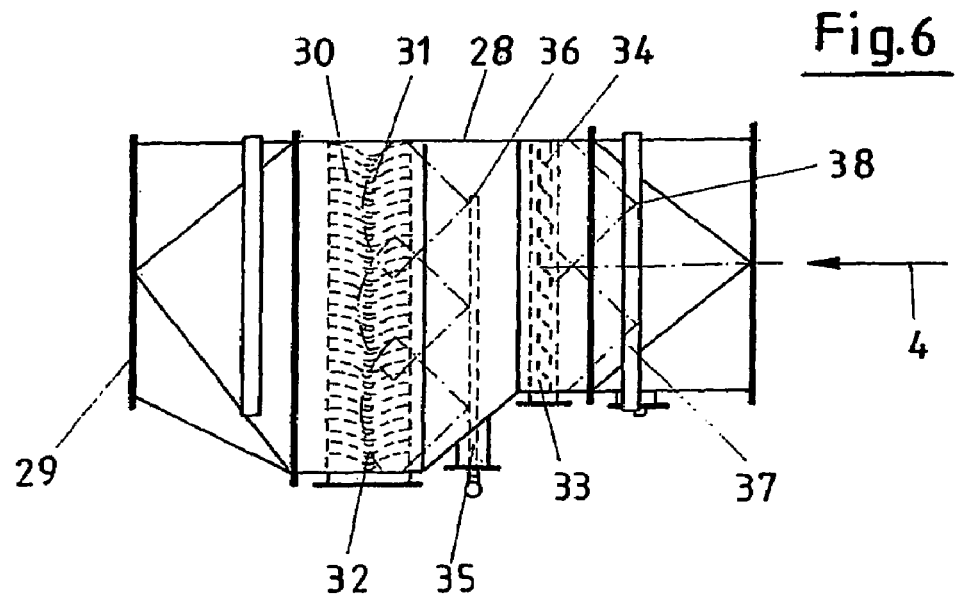

DRY DUST FILTER FOR USING IN OPERATIONS ENDANGERED BY GASES

This application claims the benefit of German Application No. 103 03 798.5 filed Jan. 31, 2003, German Application No. 103 57 684.3 filed Dec. 10, 2003 and PCT/DE2003/004271 filed Dec. 24, 2003, which are hereby incorporated by reference in their entirety.

BACKGROUND OF THE INVENTION

The invention relates to a dry dust filter for application in operations endangered by gas, in particular in underground mining and tunnel construction, the dust filter including a housing, in which one or more dust absorbing filter elements are provided through which filter elements the dust containing air current flows, the filter elements having a dust retaining filter material and/or are suitably designed therefore.

Such dust filters, also known as dry filters, are applied in different industrial fields, in order to settle dusts created in recovery or production processes as early and extensively as possible and therewith to remove such dust out of the airflow. Filter elements are accordingly arranged in a housing mostly made of metal, the filter elements consisting of filter cloth or a suitable knitwear or other similar material, through which the airflow passes so that the alter elements retain the dust during through-flow resulting in purified air flowing out through the outlet side of the housing.

These filter elements are cleaned by beating, counter flow or similar measures, whereby the dropping dust is collected and disposed of. In operations endangered by gas the air current has to be reduced to such an extent that, on impact of corresponding dust particles or other particles taken along by the air current, no sparks are created. Therewith the through-flow of such de-dusters or dust filters is reduced strongly and large plants have to be acquired or other methods for de-dusting have to be searched for.

Especially in operations endangered by gas and thereby in particular in underground mining, also no materials, which impair the remaining plants and in particular the filter self rescue devices, which have to protect workers in these operations, must be released. Such detrimental effects in particular can enter into the environment especially during glowing of parts of the filter elements or when burning, whereas the regulations provide that no toxic or adhesive residue gases are to be released into the environment. The plants, which are installed there, have to be designed correspondingly. In the U.S. Pat. No. 5,868,807 a dust filter with usual filter elements with wire mesh support is described. The crude gas has to pass a layer of fine grain material prior to reaching the filter elements. Nothing is mentioned about application possibilities in operations endangered by gas and the prevention of electrostatic charges. The honeycomb structure of the arrangement according to the U.S. Pat. No. 5,259,190 A is provided for the ignition of gas or the combustion of carbon dust. In the filter for diesel power machines according to WP93/13303 the filter bodies are joined to an energy supply. Nothing is said about preventing electrostatic charges.

SUMMARY OF THE INVENTION

The invention therefore has as object to create a dry dust filter, which also can be applied in operations endangered by gas and thereby cause no harm for self rescue devices applied underground.

The object of the invention is achieved thereby that a gas impermeable seal is provided between the housing, consisting of sheet metal or the like electrically conducting material, and the edge of the filter element a gas impermeable seal hindering or preventing the exit of harmful materials out of the housing is provided and that the filter material is designed to be electrically conducting and is connected by means of an electrical conductor bypassing the seal to the housing so that from the inside of the edge a conducting connection with the housing frame made of metal is provided.

Thereby it is possible to apply such dust filters and de-dusters consisting thereof surprisingly safe and in simple manner also in operations endangered by gas, without that the danger exists that hazards due to electro-static charging or the like can result. Even then if a fire should arise, damaging materials initially cannot escape from the housing. However, should this happen to a lesser degree, then the emerging gases cause no harm to the filter self-rescue devices so that also in extreme cases an endangerment of the persons active in this operation or the region does not exist. It is ensured that small dust particles contacting the filter elements cannot create an electrical charge because the filter element itself is electrically conductive and the created electrical currents are conducted further by way of the electrical conductor so that they reach the housing made of sheet metal and here become harmless due to the particular embodiment of the respective filter element and the de-duster produced thereof. The housing, consisting of sheet metal, is either earthed somehow or, due to suitable distribution the electrical currents are completely harmless. Thus also a possible ignition is substantially avoided.

According to a further suitable development of the invention it is provided that the filter element is joined to the housing by way of the holder elements projecting beyond the inside of the filter element, and the electrical conductor is conductively connected thereto and to the filter material. The filter element as a rule is attached by way of mounting screws or by way of similar elements to the housing, in order to provide for an exchange of these filter elements. If the filter element itself is not attached to the housing, but to a partial frame displaceable or otherwise attachable in the housing, then in any case it can be ensured that by means of the invention the electro-static charging of the overall element is reliably avoided. When screwing the mounting elements the electrical conductor is fixed, which is itself in electrical contact with the electrically conducting filter material so that the described problems cannot occur when dust particles impact at high speed onto the filter material. This, as already is in the case regarding the basic invention, has the enormous advantage that no care has to be taken regarding the air led through the housing. In fact, the optimum speeds can be applied, which ensure an optimum use of the de-duster or dust filter.

A further suitable embodiment provides that the electrical conductor is designed as copper wire strand and does not block the filter material or the filter self-rescue device in case of fire. Accordingly, on the one hand, a simple realization of the transfer of the electrical charge is ensured and simultaneously it is achieved that even in an extreme case, that is with fire, an endangerment of the important filter self-rescue devices does not occur. Such a material is also referred to as ATEX material.

The electrical conductor, preferably designed as electrical conductor of copper wire strand, is, according to a further embodiment, wavy and encloses the filter material and leads to the end pieces of holder elements. The electrical conductor therewith abuts tightly against the filter material so that a discharge is in any case ensured, in particular because the filter material is included in the electrical conductor. The communication to the housing of sheet metal via the holder elements is created by means of the electrical conductor with its end pieces.

A sliding of the end pieces of the electrical conductor off the holder elements is prevented thereby that the end pieces have loops embracing and being displaceable on the threads of the holding elements formed as screws. Thus it is only necessary to push the corresponding loop shaped end pieces over the threads of the holder elements and then to apply the nuts so that then the electrical connection is in any case ensured.

It already has been stated above that the filter material is to be enclosed by the electrical conductor. Thereby it is provided complementarily that the electrical conductor is joined to the filter material at several positions. As a rule it is sufficient if the filter material is suitably tightly enclosed by the electrical conductor. The invention provides that the electrical conductor with the filter material is joined conductively at several positions in order to ensure that, during corresponding shaking movements or other loads, the tight contact between electrical conductor and filter material is ensured.

The creation of electrical charges is avoided by suitable filter material, whereby the invention here provides that the filter material is coated or is drenched with anti-static material and that the connection of the surface of the filter material is formed permanently. Thereby, by way of this embodiment it is ensured that the filter material achieves its actual object, namely to remove the dust particles from the air current and to render these particles "harmless". Filter material coated with anti-static material can be produced by way of present day technology, in that anti-static material, for example in the form of a salt, is applied to the actual filter material or filter cloth. Thereby it is ensured that it is not separated from the filter material by the air current, in the case of moist or even water droplets taken along by the air when, however, special precautions are necessary, which prevent or exclude the occurrence of such water constituents. Thereby the dust particles are bound reliably by the filter material because, according to a further development, it is provided that the filter material has a coating, which forms a not-easily inflammable anti-static, microporous foam membrane, which is arranged on the onflow side. By means of the microporous design of the membrane it is ensured in particular that the air passes through the filter material and is discharged as purified air.

The optimum micro-porous design of the foam membrane is achieved in particular if the coating is an acrylate foam or PU foam, to which soot or to graphite is admixed.

The conductivity is achieved in particular thereby if, or is given to the filter material, the carbon fibres, salts or special steel fibres are bound into the filter material. Thus conducting components can be reliably brought into contact with the actual filter material in order to ensure the overall anti-staticness of the overall structure.

A filter material, which does not detrimentally influence the filter self rescue device, also in extreme cases, that is during fire, is that which is formed as polyimide needle felt with support fabric. This filter material furthermore advantageously is self-supporting whereas this characteristic can be enhanced by additives. For this purpose it is supplementally provided that receptors, providing the self-supporting characteristics, are added to the filter material, whereby the self-supporting characteristic is supported by way of folding or similar measures. Thereby there results advantageously a fabric, which does not need a frame, which thus can be self-supportingly pushed into the prescribed position in order to fulfil its purpose there, whereby the function can be improved further by way of characteristics mentioned hereafter.

The stiffening of the filter material by means of receptors is supported by way of a further development in that the edge of the filter element with the filter material is produced of a material PU-sealing compound with content, which is not easily inflammable and the filter material is designed circumferential or additionally supporting head and foot side or with a filter element head and filter element foot. Thereby advantageously there results an overall stiffened element, which can be pushed reliably into the working position and from there can also be exchanged, if found to be necessary during cleaning of the individual filter elements. In particular the micro-porous foam membrane already mentioned leads to de-dusting degrees of optimum values, whereby 0.1 $mg/cm^3$ can be achieved without problems by way of such filter elements.

If air containing larger quantities of moisture are supplied to the housing, then the invention provides that the filter housing has a filter entry with a connection flange, which is designed corresponding to a coupling flange of an associated pre-separator, which is provided with separator profiles formed to be flow favourable and designed to separate water droplets and aerosols. The invention provides, stated in simple terms, that the moisture constituents are removed from the air current flow at an early stage and this being not by heating, but in fact thereby that separator profiles are placed into the air current, which remove the water droplets and aerosols from the air current. Naturally still a part of the dust in the form of slag will be carried out but this is not disadvantageous but in fact is advantageous because thereby the subsequent actual dedusting parts are relieved. These water droplets or aerosols and the corresponding liquid or the slag are collected at or in the pre-separator and then are disposed of.

A reliable separation of the water droplets and aerosols is achieved in accordance with the invention in particular thereby that a baffle with angle profiles is arranged upstream of the separator profiles, whereby the separator profiles have noses projecting counter to the flow direction of the air or the dust containing air and forming a type of pocket. By means of these baffles simultaneously also too large dimensioned dust particles are separated so that the subsequent separator profiles and, behind them, the filter elements are simultaneously protected. The baffles with angle sections are connected to the slag pump and the collection parts of the separator profiles so that both simultaneously receive a waste disposal.

Due to the unavoidable contamination a continuous operation of the dust filter or the de-dusters is ensured because the separation profiles and the angle sections of the baffles are provided with a supply tube and are arranged upstream of water nozzles discharging in flow direction of the air. The water nozzles, for example, are stopped during stopping of a tunnelling machine or other dust creation machines and ensure that both the separator profiles as well as the angle profiles of the baffles are freed of sticking dust and therewith are again fully functionally available for the following operation.

It is described above that the electrical conductor is to be provided enclosing the filter material independently of the filter frame, whereby, according to a further development, it is also provided that the electrical conductor is integrated into the filter material with supporting edge, contacting the filter material and with end side connection positions for the holder elements. Thereby the possibility is given to introduce the electrical conductor as such immediately into the protection of the filter frame whereby by a two part formation of the filter frame or similar measures during the fixing of the filter material also the electrical conductor is simultaneously fixed, so that it secures the conductance of charges because, on the one hand, it has the connection parts for the holder elements, thus securing the electrical connection out of the filter frame.

The seals applied must be gas impermeable and additionally also elastic to produce the requited sealing effect. Thereby the invention provides, different to the embodiment described before, between the housing consisting of sheet metal or other electrically conducting material and the edge of the filter element, a gas impermeable seal, which is joined to the electrically conducting filter material and itself can be electrically conducting or be coated with such an elastically formed material. In particular the embodiment with the electrical coating provides the possibility to ensure the requited sealing effect by elasticity whereby this solution is applicable and suitable in particular if the dimensions, in particular of the gas impermeable seal, are relatively large.

The invention is characterized further thereby that a filter element or a dry filter with suitable filter elements is created, which also can be applied in safety relevant operations endangered by gas. The invention therefore is particularly advantageous because a de-duster is made available, which can be applied both in normal operations and also in operations endangered by gas, but which also can be applied in such operations, which at times are endangered by gas and then again have a normal operation. Thereby the expense incurred for allowing such applications is as low as possible because the constructional form of the filter element and the overall dust filter can be retained. It is merely necessary to provide a connection between the housing made of sheet metal and the corresponding filter elements, which is possible in elegant and simple manner. Thereby the discharge of correspondingly larger or smaller filter surfaces possible because the electrical conductor applicable does not engage only in spots but also ensures that an area "discharge" is achieved. Simultaneously it is emphasised as being essential that the electrical conducting filter material applicable also does not endanger filter self-rescue devices applicable in case of fire in underground mining or in similar other operations, that is due to the released fire residues and gases these filter self-rescue devices cannot be blocked and therewith tendered ineffective. In fact the filter rescue devices also remain operative in such extreme cases and therewith can lead the carriers of such filter rescue devices also into regions, which are safe. It is furthermore advantageous that even then if actual problems occur within the dust filter, these are sealed such that endangering gases cannot emerge therefrom or also be made harmless therein. Here the electrically conducting filter material assists to reduce further danger or to prevent it. It finally is advantageous that the filter elements themselves also can be developed further such that they are simple to be mounted because, for example, a filter frame is not required any longer or can be handled simply, because it has the required self-stiffness and by way of suitable coatings its effectiveness can be increased and improved and therewith very good values can be achieved.

Further details and advantages of the object of the invention result from the subsequent description of the associated drawing, in which a preferred example of an embodiment with the details and individual parts necessary therefore is illustrated. It is shown in:

DETAILED DESCRIPTION OF THE PREFERRED EMBODIMENTS

Figure 1:
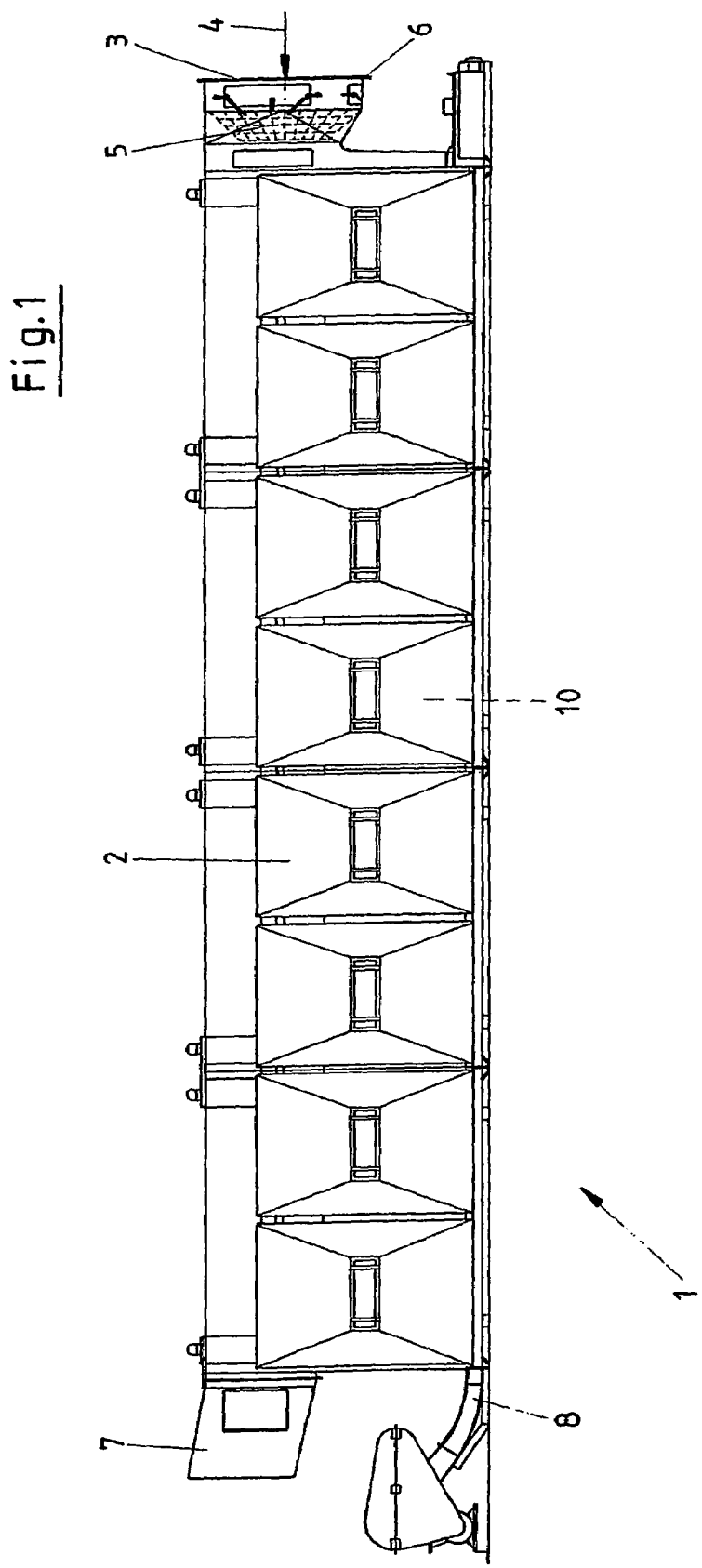
FIG. 1 a dry dust filter with filter elements in side view,
FIG. 2 a section through the dry dust filter shown in FIG. 1 with a filter element,
FIG. 3 an individual filter element with connection of the edge and the housing,
FIG. 3a a filter material with a coating,
FIG. 4 an electrical conductor in side view,
FIG. 5 a pre-separator in side view associated with the filter according to FIG. 1 and
FIG. 6 a pre-separator in plan view and partially without cover.

FIG. 1 shows a dry dust filter in side view, whereas this is composed of several individual elements. The overall unit can be supported on the floor or can be suspended by way of the hooks shown on the upper side to single suspension tail or other constructional parts. The housing 2 of all of the individual units is identical, whereby at the filter inlet 3 a coarse screen 5 for a pre-dusting takes care, that is here the coarse parts are removed from the onflowing air. The flow direction is indicated by 4;

The filter inlet 3 has a connection flange 6, which allows the flanging on of a pre-separator, which is explained further hereafter.

The filter outlet 7 forms the rear end of the housing 2, whereby the dry dust filter 1 shown here represents only one embodiment. In the housing shown here the purified air emerges from the filter outlet 7. In the housing 2 a multiplicity of filter elements 10 are arranged. These are cleaned in regular time intervals, whereby the dropping down dust drop into the removal conveyor 8, which cares in intervals for a removal of the dust. Also other collection aggregates and waste removal parts are possible.

Figure 2:
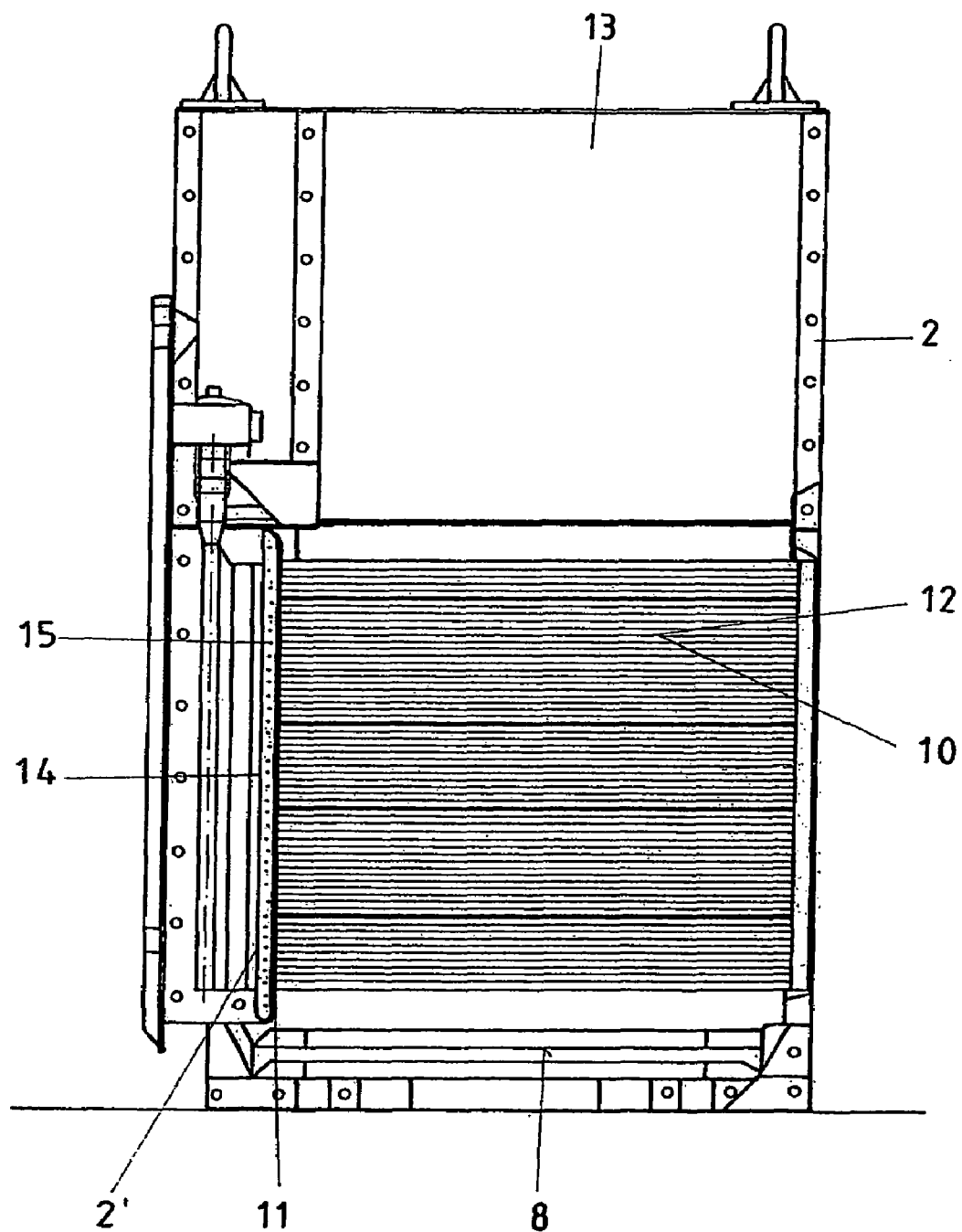

FIG. 2 shows a section through the housing 2 with a filter element 10 arranged therein. This filter element 10 has a circumferential edge 11, which is fixed on the wavy cloth shaped filter material 12. Dust containing air flow flows through this air, which then escapes by way of the clean gas channel 13 leaves the housing 2 of the dry dust filter 1. It is only indicated that a seal 15 is situated between the edge 11 and the housing frame 14.

This region is shown enlarged in FIG. 3, whereby it can be seen that the edge 11 surrounds the filter material 12 or represents the edge of this material.

The seal 15 is housed in the connection region with the housing frame 14 between this and the edge 11, for example in a sealing groove which is circular in diameter or similarly formed elastic sealing bead, which, on pressing together of the housing frame 14 and the filter material, takes care of a gas tight closure. This seal 15 prevents that electrostatic charges are removed in the region of the cloth shaped filter material 12 and are made harmless. FIG. 3 shows that, for removal of such charges, an electrical conductor 16 is provided, which encloses the filter material 12 and is joined to the holder elements 18, 19 consisting of metal. For this purpose the end pieces 22, 23, seen from FIG. 4, are provided with a loop 24, which is pushed over the thread 20 and therewith allows a fixing by way of nuts not shown here.

The screw head 21 and the thread 20 or this part of the holder element 18, 19 formed as screw allows precisely that from the inner side 17 of the edge 11 a conducting connection to the housing frame 14 made of metal is achieved.

FIG. 4 explains that this electrical conductor 16 encloses the filter material 12 circumferentially and takes care that always a conductance is ensured, also if only a partial charging of the filter material 12 takes place. The embodiment of the electrical conductor 16 shown in FIG. 4 is a copper strip 25.

The filter material 12 shown in FIG. 3 is an ATEX suitable material, which also cannot block filter self-rescue devices even if a fire should occur. The anti-static receives this material in particular in the example shown by application of an anti-static material in the form of a salt, by way of carbon fibres or special steel fibres 26, 27. Correspondingly FIG. 3 shows in section whereby the special steel fibres 26, 27 are merely indicated. In flow order to prevent a dissolution of these salts in case of moist air or air containing water droplets, a pre-separator 28 can be provided upstream of the housing shown in FIG. 1, which can be seen in FIG. 5 and FIG. 6. This pre-separator 28 or its housing has a copper flange, which is shaped corresponding to the connection flange 6 of the housing 2 so that an easy assembly and disassembly is possible.

The pre-separator 28 centrally has, as shown in FIG. 6, a multiplicity of pre-separator profiles 30, which are provided with noses 31, which form a type of pocket 32. These pockets 32 are open counter to the flow direction of the air so that during onflow the water droplets and aerosols contained therein are collected and are precipitated. The slag or the water collected thereby is supplied by way of a collection tube 39 to the pump connection 40, thus can be disposed thereby.

A baffle 33 with angle profiles 34 is provided upstream of the separator profile 30, by way of which profiles the coarse dust or coarse constituents in the air flow can be separated and also be disposed of by way of a collection tube and the pump connection 40, which is the same as for the separator profile 30. Discharge tubes 35, 37 with water nozzles 36, 38 are arranged upstream of both the separator profiles 30 as well as the angle profiles 34 whereby these water nozzles 36, 38 are adjusted such that they spray clean water in flow direction for into the separator profiles 30 or angle profiles 34 so that cleansing is achieved. This slag containing water is also discharged by way of the collection tube 39 and the pump connection 40.

The seal 15 shown or indicated in FIG. 3 itself also can be conductive for which purpose an additional reference numeral 45 is introduced. Furthermore the edge 11 can be joined directly or by way of a connection part 44, as shown in FIG. 3, to the housing frame 14 or to the housing 2. The filter element head 41 and the filter element foot 43, according to FIG. 4, are made of plastics material, which facilitates the pushing in of the individual filter elements 10. In FIG. 3a it is merely indicated that a filter material 12 can also be provided with a coating 42, for example a coating of acryl foam or PU foam, which is difficult to ignite, antistatic, micro-porous and can be processed well. This foam, being the coating 42, 42' lies on the corresponding filter material 12, whereby a discharge channel is indicated by 50 by way of which the cleaned air can flow out. Due to the coating 42 very high separator degrees can be achieved. 0.1 mg/cm$^3$ can be achieved.

Receptors are not shown, which lead to the stiffening of the filter material 12. These are supplied in order to stiffen the overall filter elements so far that a filter frame is not required but that a self-stiffening element is available. The filter element head 41 and the filter element foot 43 facilitate this.

The invention claimed is:

1. Dry dust filter for application in operations endangered by gas, comprising a housing (2), in which one or more dust absorbing filter elements (10) are provided through which filter elements the dust containing air current flows, the filter elements having a dust retaining filter material (12), characterized thereby that between the housing (2), consisting of sheet metal or another electrically conducting material, and an edge (11) of the filter element (10) a gas impermeable seal (15) hindering or preventing the exit of harmful materials out of the housing (2) is provided and that the filter material (12) is designed to be electrically conducting and is connected by means of an electrical conductor (16) bypassing the seal (15) to the housing (2) so that from the inside (17) of the edge (11) a conducting connection with the housing frame (14) made of metal is provided.

2. Dry dust filter according to claim 1, characterized thereby that the filter element (10) is joined to the housing (2) by means of holder elements (18, 19) projecting beyond the inner side (17) of the filter element (10) and the electrical conductor (16) is conductively joined thereto and to the filter material (12).

3. Dry dust filter according to claim 1, characterized thereby that the electrical conductor (16) as copper strip (25) and the filter material (12) are designed not to block a filter self-rescue device in case of fire.

4. Dry dust filter according to claim 1, characterized thereby that the electrical conductor (16) is designed to include the filter material (12) and showing end pieces (22, 23) leading to holder elements (18, 19).

5. Dry dust filter according to claim 4, characterized thereby that the end pieces (22, 23) enclose a thread (20) of the holder elements (18, 19) and have loops (24) displaceable thereon.

6. Dry dust filter according to claim 1, characterized thereby that the electrical conductor (16) is joined conductively to the filter material (12) at several positions.

7. Dry dust filter according to claim 1, characterized thereby that the filter material (12) is coated with anti-static material and/or is drenched therewith and that the connection is formed pressing the surface of the filter material (12).

8. Dry dust filter according to claim 7, characterized thereby that the filter material (22) has a coating (42), which forms a non-flammable anti-static micro-porous foam membrane, which is not easily flammable and is arranged on the flow side.

9. Dry dust filter according to claim 8, characterized thereby that the coating (42) is an acrylate foam or PU foam, to which soot or graphite is admixed.

10. Dry dust filter according to claim 1, characterized thereby that carbon fibres, salts or special steel fibres (26, 27) are included in the filter material (12).

11. Dry dust filter according to claim 3, characterized thereby that the filter material is formed as polyimide needle felt with support fabric.

12. Dry dust filter according to claim 1, characterized thereby that receptors providing self-supporting characteristics are added to the filter material (12), whereby the self-supporting characteristic is further supported by folding.

13. Dry dust filter according to claim 1, characterized thereby that the edge (11) of the filter element (10) is produced with the filter material (12) of a PU grout material with content, which is not easily flammable, and the filter material is formed circumferential or supporting a foot and head side additionally or forming a filter element head (41) and filter element foot (43).

14. Dry dust filter according to claim 1, characterized thereby that the housing (2) has a filter inlet (3) with a connection flange (6), which is formed corresponding to the coupling flange (29) of an associated pre-separator (28), which is provided with separator flow favorable profiles (30) and thereby waterdrops and aerosols are separated.

15. Dry dust filter according to claim 1, characterized thereby that a baffle (33) with angle profiles (34) is arranged upstream of separator profiles (30), whereby the separator profiles (30) have noses (31) projecting counter to the flow direction (4) of the air or the dust containing air and forming a type of pocket (32).

16. Dry dust filter according to claim 1, characterized thereby that a supply tube (35, 37) is allocated to separator profiles (30) and angle profiles (34) of baffles (33) and water nozzles (36, 38) directed in flow direction (40) of the air are arranged upstream of the separator profiles.

17. Dry dust filter according to claim 1, characterized thereby that the electrical conductor (16) is contacting integrated in the filter material (12) with supporting edge (11) and has connection parts (44) for the holder elements (18, 19) at the end side.

18. Dry dust filter for application in operations endangered by gas, comprising a housing (2), in which one or more dust absorbing filter elements (10) are provided through which filter elements the dust containing air current flows, the filter elements having a dust retaining electrically conducting filter material (12), characterized thereby that between the housing (2), consisting of sheet metal or another electrically conducting material, and the edge (11) of the filter element (10) a gas impermeable seal (15) is provided, which seal is joined to the electrically conducting filter material (12) and itself is designed to be electrically conducting or is coated by means of an elastically formed, electrically conducting material.

* * * * *

UNITED STATES PATENT AND TRADEMARK OFFICE
CERTIFICATE OF CORRECTION

| | | |
|---|---|---|
| PATENT NO. | : 7,354,474 B2 | Page 1 of 1 |
| APPLICATION NO. | : 10/543785 | |
| DATED | : April 8, 2008 | |
| INVENTOR(S) | : Reinhold Both | |

It is certified that error appears in the above-identified patent and that said Letters Patent is hereby corrected as shown below:

On Title Page

Item (86) PCT No., should read:

--PCT/DE2003/004271--

Signed and Sealed this

Eighth Day of July, 2008

JON W. DUDAS
*Director of the United States Patent and Trademark Office*